Patented Sept. 22, 1942

2,296,524

UNITED STATES PATENT OFFICE 2,296,524

TREATMENT OF FLAX STRAW

Clark C. Heritage, Cloquet, Minn., assignor to Wood Conversion Company, Cloquet, Minn., a corporation of Delaware No Drawing. Application December 16, 1938, Serial No. 246,051

6 Claims. (Cl. 19—5)

The present invention relates to preparation of fiber from flax straw.

There are two stages in the growth of flax which provide straw commercially. Fiber flax straw results from cutting the green plant to obtain the fiber for high grade linen. Flax is also grown for seed as well as for linen, and when the plant ripens it is cut for seed. A large amount of seed flax straw is thus available. The fiber at this stage is of too poor a quality for linen, but is used to a small extent in various coarser arts, as so-called tow, and for low grade rugs. Large quantities of seed flax straw are wasted annually for want of a practical processing method. One difficulty with the seed flax straw is that in ripening, the shive (non-fibrous material) is more tightly adherent to the bast (fiber) and not readily removed. For high grade bast fiber the shive must be entirely removed. It is difficult to remove the shive from the bast of seed flax straw and yet preserve the fiber. Therefore, for obtaining good fiber, it is necessary to have a process which delivers a useful fiber. Although many have worked on the problem of utilization of seed flax straw, the perfect separation of bast from shive at a practical cost has never been accomplished.

Flax fiber straw has a more readily separable shive and bast, but the separation is not an easy one. One procedure calls for retting in stagnant water to cause micro-organisms to act on the stock and loosen the shive.

The object of the present invention is to separate completely the bast and shive of flax straw in a simple, quick and efficient manner, with a high yield of useful bast fiber.

Another object of the invention is to avoid costly chemical pulping in the separation of bast and shive, and the consequent changes induced in the fiber by chemical action.

Another object is to isolate bast fiber in substantially the same condition physically and chemically as it existed in the stalk of the flax plant at the time of harvest containing valuable natural gums and waxes, especially the latter.

A particular object of the invention is to subject flax straw to an elevated temperature for softening elements of the straw, and mechanically acting on the heated straw to rub the shive off the fiber, while preserving a useful fiber.

I have found in particular that when dry or moist flax straw is subjected to an atmosphere of wet steam, preferably under pressure, it is softened, and that the softened straw while in the steam atmosphere may be mechanically rubbed to disengage the shive off the bast. The preferred manner of abrading the straw is to pass it through a high speed moving device, such as one having a rotary element running against a like rotary or a stationary complementary element. The machines having rotary plates useful for grinding wood to fiber are suitable. These are commonly capable of adjustment of the grinding surfaces to predetermine the particle size and distribution of material discharged. In operation upon flax the setting is very fine to assure that the fine flax fiber formed is exposed to the plates to rub off the adherent shive.

While some of these machines are available in a design calling for grinding of wood in a water vehicle, they may be readily altered in design to provide for a steam vehicle and be provided with suitable feed and discharge mechanisms. The machine of Asplund U. S. Patent No. 2,145,851, and the process of Asplund Patent No. 2,008,892, exemplify in more detail the type of machine and process which I have used. The machine and process are designed to make pulp from wood and straw with a high yield of pulp, retaining the lignin and encrusting agents along with the ultimate fiber. This accounts for the high yield, the lignin remaining with the fiber as lignocellulose.

Straws are basically dried grasses. Flax is not a grass, but a plant, and is different from grasses. Flax is distinctive in that the fibers available in the bast are very long and are high in cellulose. The are arranged on the outer side of the stalk. The shive is cellular and not fibrous, and is largely inside the stalk. It is removable in chunks. It has a high lignin content of great resistance to chemical action. The fiber and shive appear not to be associated as the fiber and lignin in wood and grasses, in what is called lignocellulose. In wood the lignocellulose can be broken down by chemical cooking to obtain the cellulose fiber. Also the lignocellulose may be softened chemically so that fibers of lignocellulose are obtained. The Asplund process softens the lignocellulose by heat and then breaks the mass into a pulp of lignocellulose fibers with high yield.

The shive of flax straw is difficult to alter or loosen or separate by chemical action without destroying the useful properties of the bast. Once the bast is obtained it may be purified by a mild treatment as by use of lime.

When flax straw is treated according to this invention it breaks down into clean bast fiber and chunks of shive, rather than into a fibrous pulp. The discharged mixture of fiber and shive may be readily separated into clean fiber and shive, by floatation, decantation, screening and like common operations.

Where the process is carried out on fiber flax straw, a high grade flax fiber for linen may be obtained. Where it is carried out on seed flax straw, the fiber may be used as a low grade linen, for cord or thread, for fine papers in place of rag stock, for condenser paper, cigarette paper, record paper, and many other uses. The natural fiber contains up to about 3% of waxes which are retained by the fiber for many advantages in such uses.

In carrying out the process I prefer the flax straw should be dry, or quite moist, but not carrying free water. Drying shrinks and unifies the material of a chunk of shive, assisting it to be torn from the bast when softened by the heat. The dry or moistened dry material is fed into a steam chamber at 212° F. or higher where pressure is used. The softened material is fed to the grinding elements and is discharged by suitable means. The moist discharge may be directed into a drier, or into water. When I discharge into water, I make the separation of shive and bast in a water vehicle. The requirement of a moisture content is not an essential one for all operations, and has only a practical significance. Where the process is carried out by high speed plates, there is heat developed. Too dry a material may readily be burned by this heat. Hence the use of air-dry, or even additionally moistened material is preferred for all practical operations wherein high speeds may induce burning. The temperature of the steam brings the fiber at least to 212° F. before contact with the plates. Additional heat of friction assures attaining a softening temperature. The discharged moist material may be carded to pull the fibers from the chunks of shive. I may place the discharge of the machine, or any fiber concentrate of such discharge, into a purifying liquid for the fiber, such as a lime water. The purification of the fiber may take place before or after all the shive is separated. The gums and waxes may be extracted by subjecting the material to the extracting action of a suitable solvent, such as benzol, gasoline, alcohol or the like. These may be left in the fiber for some uses, or be extracted for other uses of the fiber.

Various modifications of the process are contemplated as falling within the scope of the invention as defined in the appended claims.

I claim:

1. The method of treating flax straw which comprises heating flax straw in an environment of wet steam, mechanically rubbing the straw while so heated in said steam to disengage the resulting softened shive and the bast fiber, and separating the fiber from the shive.

2. The method of treating flax straw which comprises adding moisture to dry flax straw, subjecting the moistened flax straw in an environment of wet steam to the rubbing action of closely placed relatively high speed moving surfaces, whereby the resulting softened shive is disengaged from the bast fiber, and separating the fiber from the shive.

3. The method of treating moist flax straw which comprises subjecting the moist flax straw in an environment of wet steam to the rubbing action of closely placed relatively high speed moving surfaces, whereby the resulting softened shive is disengaged from the bast fiber, and separating the fiber from the shive.

4. The method of treating flax straw, which comprises heating the flax straw and simultaneously rubbing the heated straw mechanically in a gaseous atmosphere of wet steam, the straw originally having as much water content as air-dry straw, and removing resulting bast fiber from the product of said rubbing.

5. The method of treating flax straw which comprises introducing the straw into a chamber having wet steam therein, and in said chamber subjecting the straw to a mechanical rubbing action whereby to remove the shive from the fiber in the straw.

6. The method of treating flax straw which comprises introducing the straw into a chamber having wet steam therein, and in said chamber subjecting the straw to a continuous rubbing action whereby to remove the shive from the fiber in the straw.

CLARK C. HERITAGE.